United States Patent Office 3,521,214
Patented July 21, 1970

3,521,214
HEATING ELEMENTS
Richard J. Bennett and Alex N. Oates, Bartlesville, Okla., assignors to Phillips Petroleum Company, a corporation of Delaware
No Drawing. Filed Dec. 12, 1966, Ser. No. 600,776
Int. Cl. H01b 1/06; H01c 1/00
U.S. Cl. 338—322
4 Claims

ABSTRACT OF THE DISCLOSURE

Electrically conductive compositions useful as heating elements are prepared by molding an arylene sulfide polymer such as polyphenylene sulfide and a conductive amount such as 4 to 50 weight percent of a finely-divided carbon black.

---

This invention relates, in general, to electrical heating devices, and more particularly is directed toward a new and improved heating element. In accordance with one aspect, this invention relates to an electrically conductive composition comprising an arylene sulfide polymer and carbon black. In accordance with a further aspect, this invention relates to heating elements suitable for being energized by electricity and formed by molding a polyphenylene sulfide polymer having dispersed therein a small amount of carbon black into a desired form or shape and imparting thereto a predetermined electrical and heating characteristic.

The expanding use of electricity for heating purposes has created a demand for heating elements which can be readily and economically produced in various forms, including tapes, sheets, etc., and which can be so constructed as to disperse or retain predetermined amounts of heat energy as may be required. Commonly used today are systems which utilize lengthy strands of highly conductive material such as finely drawn copper, Nichrome, or other metallic wires. Serious objections to this type of structure have arisen which renders its use uneconomical and at times dangerous. Attempts have been made to overcome these objections by various devices. The most common expedient is to coat a fibrous base with metallic or conductive resinous materials. Resulting structures have been inadequate in that the elements thus produced do not have predetermined uniform heating capabilities. In other instances, these materials are subject to cracking and flaking due to heat, thus causing a progressive deterioration during the course of use of such elements.

Accordingly, an object of the present invention is to provide a new and novel structure and method of manufacturing the same in the nature of a heating element.

Another object of this invention is to provide novel heating elements with different heating capacities.

Another object of this invention is to provide simple yet effective electrically energized heating elements.

Other aspects, objects, as well as the several advantages of this invention will be apparent to one skilled in the art upon a study of this disclosure and the appended claims.

According to the invention, an electrically conductive composition of matter is provided, comprising an arylene sulfide polymer and a conductive amount of a finely divided carbon black dispersed therein.

A presently preferred arylene sulfide polymer for use in the invention is the type of polymer prepared by copending application Ser. No. 327,143, filed Nov. 24, 1963, now U.S. 3,354,129.

According to said copending application, arylene sulfide polymers are prepared in high yield by reacting at least one polyhalo-substituted cyclic compound containing unsaturation between adjacent ring atoms and wherein the halogen atoms are attached to ring carbon atoms with an alkali metal sulfide in a polar organic compound at an elevated temperature. Generally the polar organic compound will substantially dissolve both the alkali metal sulfide and the polyhalo-substituted aromatic compound or other compound which may be present.

In accordance with said copending application, polyaromatic sulfides of small particle size are produced when selective polyhalo-substituted aromatic compounds are reacted with an alkali metal sulfide in a polar organic solvent at an elevated temperature. The said polyaromatic sulfides of small particle size separate from the reaction mixture in a finely divided form, at least one dimension of the particles usually falling within the range of about 0.5–100 microns. To separate the polyaromatic sulfides in such a finely divided form, the polyaromatic sulfide will have a melting point or softening point above the temperature at which the polymer separates from the solution.

Mixing of the pigments, dyes, toners or other colorants with the finely divided polyphenylene sulfides produced according to said copending application can be done by preparing the colorants in the presence of a finely divided polymer or by mixing the colorant with the polymer in suspension or in powder form.

The polyhalo-substituted compounds which can be employed as primary reactants according to said copending application are represented by the formulas:

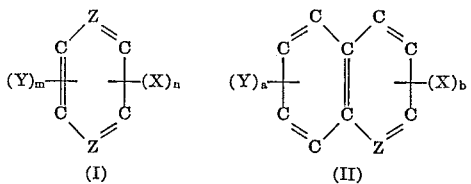

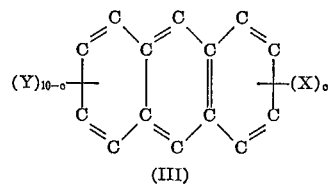

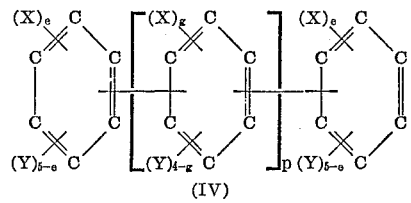

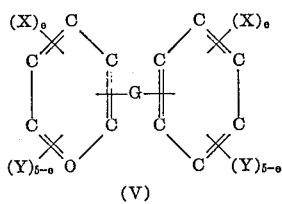 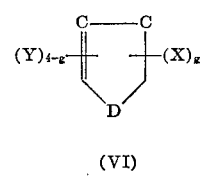

wherein each X is a halogen selected from the group consisting of chlorine, bromine, iodine, and fluorine, preferably chlorine and bromine, each Y is selected from the group consisting of hydrogen,

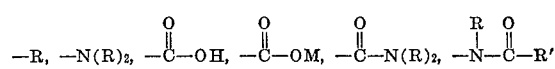

—O—R', —S—R', —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

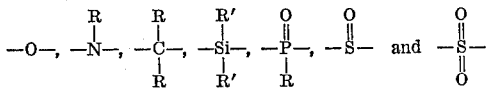

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said copending application are represented by the formula $M_2S$, wherein M is as defined above, and includes the monosulfides of sodium, potassium, lithium, rubidium and cesium, including the anhydrous and hydrated forms of these sulfides. The preferred sulfide reactant is $Na_2S$ and its hydrates. This sulfide can be purchased having 9 mols of water of hydration per mol of $Na_2S$, or it can be obtained containing about 60–62 weight percent $Na_2S$ and about 38–40 weight percent water of hydration.

The polar organic compounds which are employed as reaction media in the process of said copending application should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfolane, dimethylacetamide, low molecular weight polyamides and the like.

Some specific examples of polyhalo-substituted compounds of the above general formulas which can be employed in the process of said copending application are:

1,2,4-trichlorobenzene
1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
hexachlorobenzene
1-n-butyl-2,5-dichlorobenzene, and the like.

The process of said copending application is carried out by contacting one or more of the above-defined reactants in a polar solvent at a temperature of from about 125° C. to about 450° C., preferably from 175° C. to 350° C. The mol ratio of polyhalo-substituted aromatic or heterocyclic compounds to alkali metal sulfide reactants should be at least 0.9:1 and will generally not exceed 2.0:1. The amount of polar organic solvent present in the reaction zone can vary over a wide range of from about 100 to 2,500 ml./mol of alkali metal sulfide.

The carbon black suitable for use in the electrically conductive compositions of the invention include thermal blacks, acetylene blacks, furnace blacks and channel blacks. The particle size of the carbon blacks used in the invention ordinarily range from about 14.0 to about 190 millimicrons but even finer blacks can be used such as certain color blacks. Although any of the above noted carbon blacks can be used, furnace blacks known as Philblack E, Philblack O, etc., having a particle size in the range of about 14–35 millimicrons have been found to yield the best results.

The amount of carbon black present in the compositions of the invention ranges from 4 to 50 weight percent. Preferred compositions comprise polyphenylene sulfide and from 4 to 10 weight percent of a furnace carbon black.

To prepare the compositions of this invention, the finely divided carbon black is admixed with, say, particulate arylene sulfide polymer by any means known to one skilled in the art and then formed, for example, by molding, into any suitable shape for use as a heating element. The polyphenylene sulfides that can be employed according to the invention are heat moldable, highly resistant polymers which, after molding, having high structural strength and are highly heat resistant.

It is also within the scope of the invention to introduce the carbon black into the polymerization reactor and mix the carbon black with the polyphenylene sulfide in situ as it is formed in the polymerization reaction.

As noted above, polyaromatic sulfides of small particle size are produced when selective polyhalo-substituted aromatic compounds are reacted with an alkali metal sulfide in a polar organic solvent at an elevated temperature in accordance with said copending application. Thus, upon recovery of a finely divided particulate polyphenylene sulfide having dispersed therein carbon black, the particles can be molded into the usual shapes desired for heating elements in accordance with known procedures.

Since the conductive material is rigid and usable as construction material, a large number of potential uses suggest themselves: immersion heaters, hot boxes, incubators, hot plates, vacuum ovens, driers, radiant heat panels, water heaters, sterilizers, tubular heaters, electrodes, and the like. When desired, insulation is provided for the heating elements by molding non-conductive polyphenylene sulfide over the heating element.

Electrical energy can be supplied to the heating elements of the invention in the form of alternating or direct current. In either event, opposite ends or corners of the heating element or one or more strips of conductive material are provided with electrical terminals.

SPECIFIC EXAMPLE

A polyphenylene sulfide polymer prepared according to the procedure of said copending application was prepared by reacting paradichlorobenzene and 1,2,4-trichlorobenzene with sodium sulfide monohydrate in N-methyl-2-pyrrolidone diluent.

The polyphenylene sulfide polymer was then mixed together with carbon black and the mixture thus formed was ball milled and subsequently molded into heating elements or plates having the compositions and properties as set forth hereinbelow.

Plate A—70 g. resin 30 g. carbon black (Fisher 5–690) (30 percent) compression molded with Al electrodes. Slab ⅜ x 1¹⁵⁄₁₆ x 6 inches—resistance 0.6 ohm;

Plate B—47.5 g. resin 2.5 g. carbon black (Cabot Vulcan XC–72) (5 percent). Slab ⅛ x 1 ¹⁵⁄₁₆ x 6 inches—resistance 100 ohms. This was run at 50 volts AC/0.5 amp for 2 hours. The temperature was measured at the center of the slab with a registrating thermocouple apparatus at 300° F.;

Plate C—45 g. resin 5 g. carbon black (Phillips Philblack E) (10 percent). Slab ⅛ x 1¹⁵⁄₁₆ x 6 inches—resistance 150 ohms at 45 volts AC and 0.3 amp;

Plate D—95 g. resin 5 g. carbon black (as with Plate B) (5 percent). Slab 5⅞' x 4' x ⅛' was run at 35 volts AC and 0.4 amp for 8 hours at 300° F.

As will be observed from the above heating plates, the resistance decreases with increasing proportions of carbon black. A particular advantage of the heating elements of the invention is that they can be subjected to prolonged periods of elevated temperature, say, 350° F., and for shorter periods at an even higher temperature, since the plastic is stable at temperatures above 650° F. For comparison a slab was molded using 80 g. resin and 20 g. of aluminum powder (Fisher fine grade, ⅛ x ¼ x 1 inch. The slab had the appearance of aluminum but was nonconductive. The actual conductivity could not be measured on a laboratory volt-ohm meter.

Reasonable variation and modification are possible within the scope of the foregoing disclosure and the appended claims to the invention, the essence of which is that electrically conductive heating elements are provided comprising polyphenylene sulfide and carbon black.

We claim:

1. A molded electrically conductive composition adapted to develop heat when connected to a source of electric energy consisting essentially of (a) a heat moldable, highly resistant arylene sulfide polymer which, after molding, has high structural strength, and a conductive amount ranging from 4 to 10 weight percent of (b) a finely divided carbon black dispersed in said polymer and (c) connector terminals in direct contact with said composition.

2. A composition according to claim 1 wherein the arylene sulfide polymer is polyphenylene sulfide.

3. A composition according to claim 1 wherein the particle size of the carbon black ranges from about 14 to about 190 millimicrons.

4. A composition according to claim 2 wherein (b) is a furnace carbon black having a particle size in the range of about 14–35 millimicrons.

References Cited

UNITED STATES PATENTS

| 2,199,803 | 5/1940 | Light | 252—511 X |
| 2,386,095 | 10/1945 | Edgar et al. | 252—511 X |
| 3,354,129 | 11/1967 | Edmonds et al. | 260—79 |

RICHARD D. LOVERING, Primary Examiner

U.S. Cl. X.R.

252—511; 338—334